Figure 3:
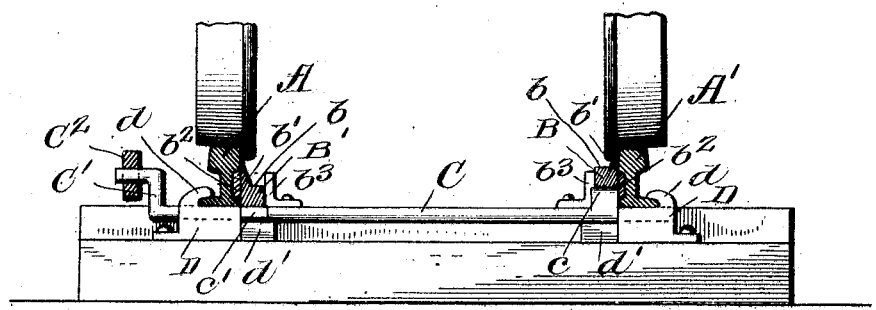

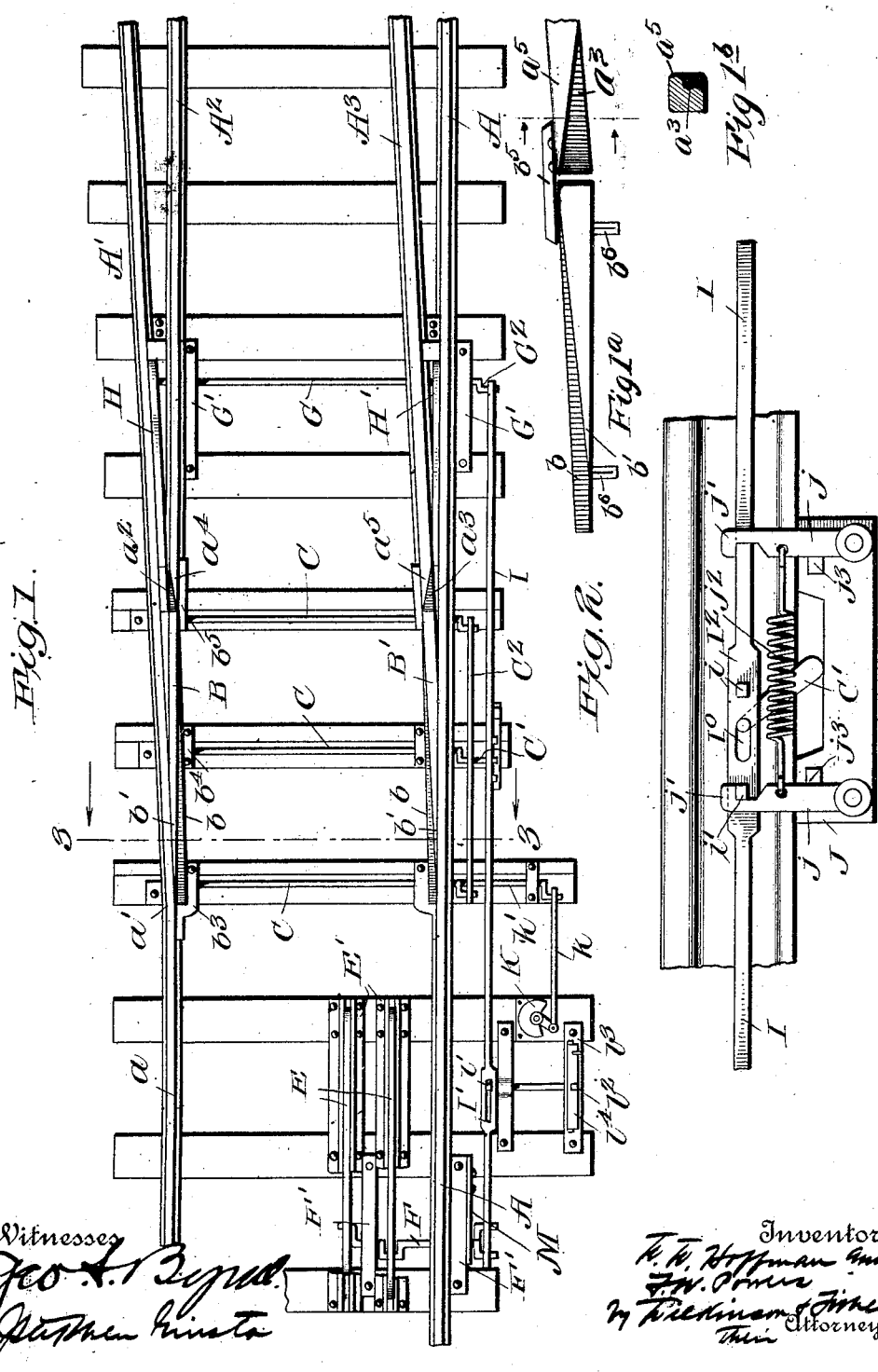

No. 818,378. PATENTED APR. 17, 1906.
W. W. HOFFMAN & F. W. POWERS.
RAILWAY SWITCH.
APPLICATION FILED JUNE 29, 1905.

4 SHEETS—SHEET 2.

No. 818,378.  
PATENTED APR. 17, 1906.

W. W. HOFFMAN & F. W. POWERS.  
RAILWAY SWITCH.  
APPLICATION FILED JUNE 29, 1905.

4 SHEETS—SHEET 3.

Witnesses  
Inventors

No. 818,378. PATENTED APR. 17, 1906.
W. W. HOFFMAN & F. W. POWERS.
RAILWAY SWITCH.
APPLICATION FILED JUNE 29, 1905.
4 SHEETS—SHEET 4.
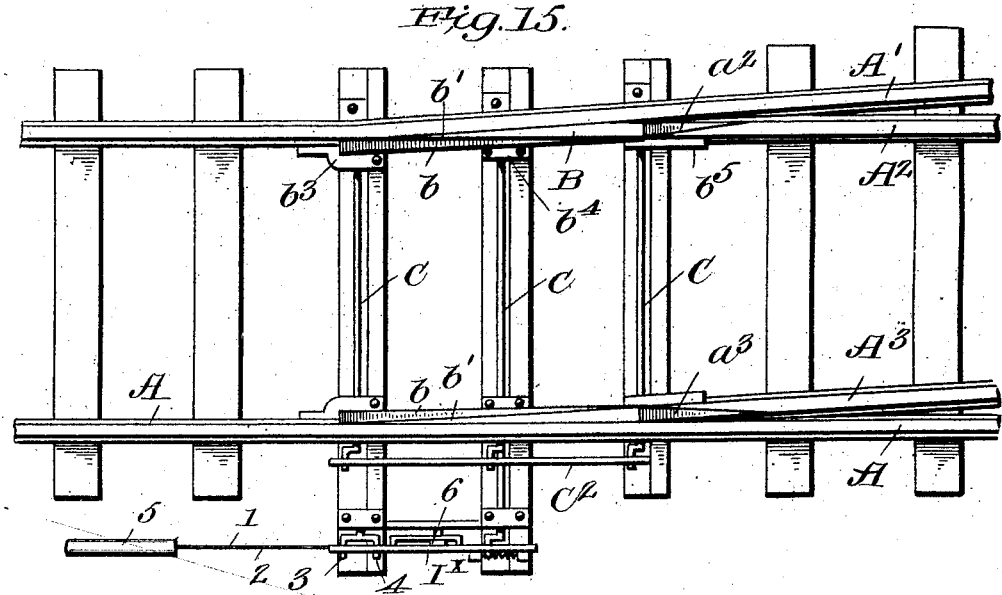
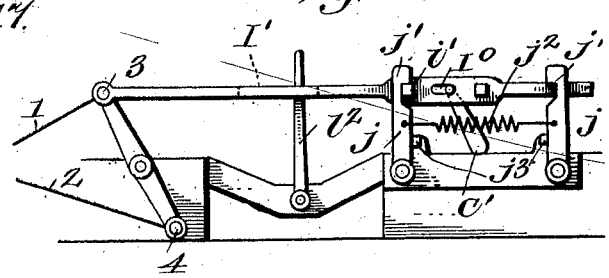
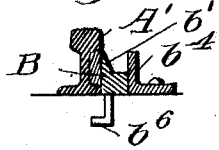
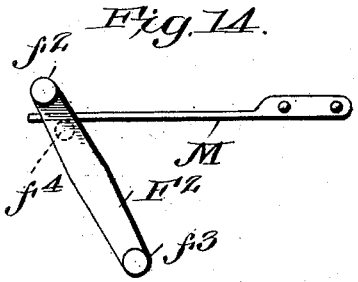
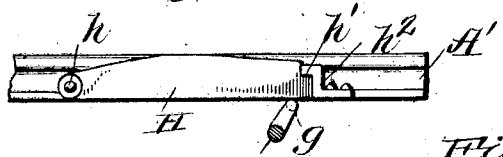
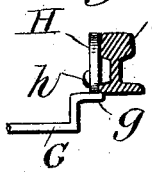
Witnesses
Inventors

UNITED STATES PATENT OFFICE.

WILLIAM W. HOFFMAN, OF LA FAYETTE, AND FRANCIS W. POWERS, OF WEST LAFAYETTE, INDIANA, ASSIGNORS TO ELECTRIC & STEAM RY. SUPPLY CO., OF LA FAYETTE, INDIANA.

RAILWAY-SWITCH.

No. 818,378.  Specification of Letters Patent.  Patented April 17, 1906.

Application filed June 29, 1905. Serial No. 267,635.

*To all whom it may concern:*

Be it known that we, WILLIAM W. HOFFMAN, residing at La Fayette, and FRANCIS W. POWERS, residing at West Lafayette, in the county of Tippecanoe, State of Indiana, citizens of the United States, have invented certain new and useful Improvements in Railway-Switches; and we do hereby declare the following to be a full, clear, and exact description of the invention, such as will enable others skilled in the art to which it appertains to make and use the same.

This invention relates to railway-switches, particularly of that type wherein the switch-points may be automatically thrown by the moving train or operated by a local or distant station.

The invention is particularly designed as an improvement on the constructions illustrated and described in our former United States patents, Nos. 664,750, granted December 25, 1900, and 698,952, granted April 29, 1902.

Primarily the broad object of the invention consists in continuing the broken rails of the main track and siding and reducing their ends in such manner that a switch-point of short length may be employed, the switch-point under the present invention being also adapted to be bodily raised and lowered in contradistinction to the construction of our former patents, wherein the switch-points are in pivotal connection with their respective rails.

Another object of the invention is to provide automatic means, preferably operated by the car-wheel flange, to properly set the switch to prevent the jamming of wheels between the switch-points and rails in the moving of a train from the siding to the main track, if the switch is set for the main track, or in the same direction of movement on the main track, should the switch be set for the siding.

Other objects and advantages reside in the details of construction of various parts operatively combined in the perfection of the appliance, the particular features of novelty of which will appear in the following description and will be more succinctly specified in the claims.

To more fully understand the invention reference is had to the accompanying drawings, illustrating an application of the same, in which like letters designate the same parts in the several views, and in which—

Figure 4:
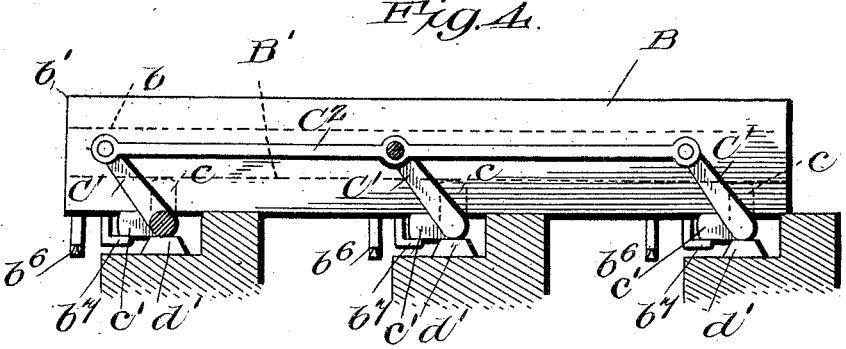
Figures 5, 6, 7:
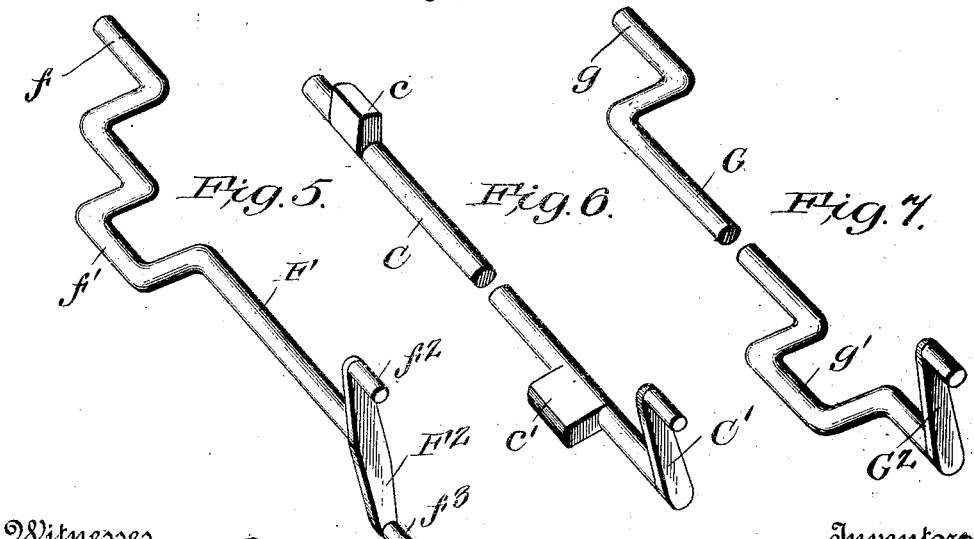
Figure 8:
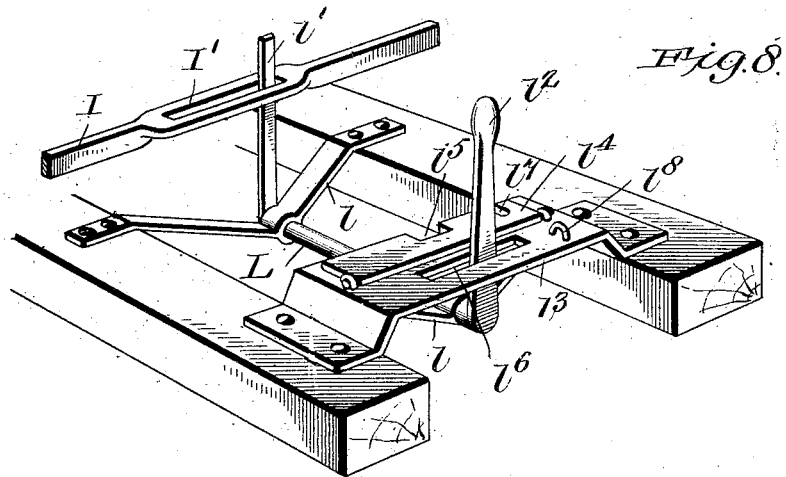
Figure 9:
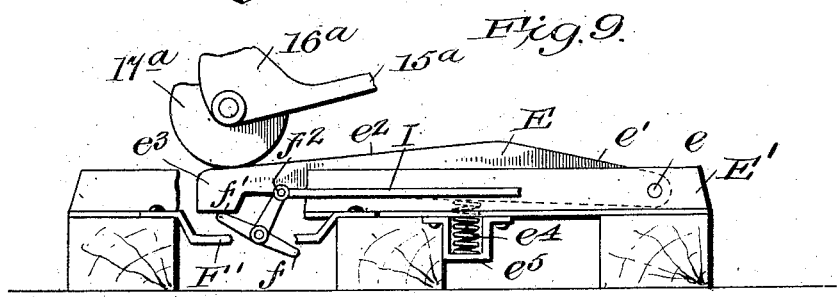
Figure 10:
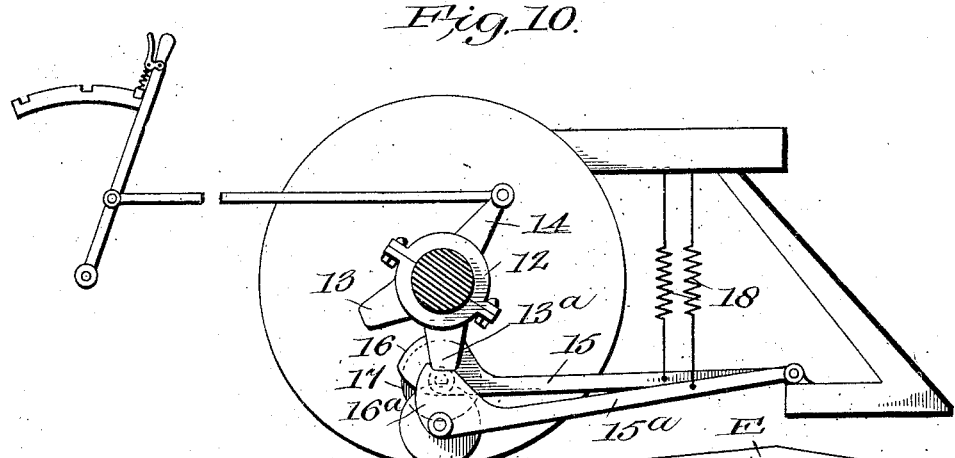

Figure 1 represents a plan view of a railway-switch constructed according to our invention, the parts being shown in their assembled position with the main track clear or open. Fig. 1ᵃ is a local plan view of one of the switch-points associated with the cut-away or recessed end of one of the broken rails, a portion only of the broken rail being illustrated. Fig. 1ᵇ is a cross-section through the cut-away end of one of said broken rails, showing the wedge-shaped tread portion and its adjacent recessed portion. Fig. 2 is a detail fragmentary view, in side elevation, showing a locking device for the operating-rod whereby the switch-points will be held locked in their full open or closed position. Fig. 3 is a transverse section on the line 3 3 of Fig. 1 looking in the direction of the arrows, the position of the switch-points, as in Fig. 1, being set in position for maintaining the main track open. Fig. 4 is a detail view, in side elevation, of one of the switch-points and its operating mechanism, the switch-point being shown in its lowermost position and the position of the other switch-point being shown in dotted lines. Figs. 5, 6, and 7 are detail perspective views, respectively, of the main operating-crank, the rock-shafts, and the flange-operated crank. Fig. 8 is a fragmentary perspective view of the local hand operating mechanism. Fig. 9 is a fragmentary detail view, in side elevation, showing one of the contacting plates with the contacting device carried by the rolling-stock engaging therewith. Fig. 10 is an enlarged detail view, in side elevation, showing the construction of the contacting device carried by the rolling-stock. Fig. 11 is a fragmentary detail view, in side elevation, showing one of the auxiliary pivoted plates adapted to be contacted by the flange of the car-wheel and which will be hereinafter termed the "flange-plate." This view shows the operating-crank for the flange-plate and particularly means for limiting the upward movement of the plate. Fig. 12 is a fragmentary view, being a cross-section of Fig. 11, showing the position of the crank under the flange-plate. Fig. 13 is a fragmentary view, in cross-section, showing one of the switch-points in its depressed position, with means thereon for limiting the upward movement of said switch-point and also a side guard or guide for the switch-point. Fig. 14 is a detail view showing means connected with the main crank, tending to hold the said crank in its extreme position. Fig. 15 is a plan view of a simplified construction adapted for use as a hand-switch or in an interlocking system. Fig. 16 is a fragmentary view, in side elevation, of a portion of the mechanism shown in Fig. 15, the actual locking device in this figure being substantially the same as shown in Fig. 2; and Fig. 17 is a diagrammatic view of the indicating mechanism and means for operating the switch from the distant station or office.

Referring more particularly to Fig. 1, A designates the unbroken rail of the main track; $a$, the opposite rail bent outwardly, as at $a'$, to form one of the rails A' of the siding. $A^2$ designates the broken rail of the main track, forming a continuation of the rail $a$ through the interposition of one of the switch-points, and $A^3$ is the opposite rail of the siding, forming a continuation of the main rail A through the interposition of the other switch-point.

As shown in Figs. 1 and 15, the ends of the rails $A^2$ and $A^3$ are formed with beveled cut-away portions $a^2$ $a^3$, the recess or cut-away portion, as clearly shown, being gradually widened as they approach the outer end of the rail, leaving the tread portions $a^4$ $a^5$ terminating in sharp vertical edges extending adjacent the movable switch-points. This construction is of particular importance, inasmuch as by cutting away the outer end of the fixed rails $A^2$ $A^3$, as just described, when either of the switch-points is in its lowermost position (and the flanges of the wheels on that side of the track will therefore pass between the rails A $A^3$ or A' $A^2$, as the case may be) provision is made by this construction for the passage of the flanges of the wheels through the cut-away portion $a^2$ or $a^3$, thereby enabling the ends of the rails $A^2$ $A^3$ to be brought much closer to the main rails than heretofore, and consequently requiring a switch-point of much shorter length.

Referring particularly to Figs. 1, 3, 4, 13, and 15, and particularly Figs. 1 and 3, B and B' designate switch-points provided with the cut-away portions $b$, which cut-away portions form horizontal faces gradually decreasing in width from the forward to the rear end of the switch-points, the rear portion of the horizontal surface gradually merging into the solid rear end of the switch-points and the forward tread portions $b'$ of the switch-points gradually tapering outwardly and terminating in vertical knife-edges. In this construction the lower portion of the switch-points is of uniform thickness throughout its length, only the tread portion being tapered, as in the ordinary construction, to make intimate contact with the main rails. Thus it will be seen that a much stronger and more durable switch-point is provided, necessarily prolonging life of same, with all the features of the former construction the cut-away portions $b$ allowing the flanges of the wheel to pass over the enlarged base portion, so that as far as the tapering points are concerned the switch-point operates as heretofore. As stated, these switch-points B and B' have no pivotal connections, but are bodily operative in vertical planes, the operating means being so constructed and associated with the switch-points as to elevate one while the other is being lowered, guards being provided for guiding the switch-points in their vertical movement, as also means to limit the upward movement of the switch-points, and to insure the positive depression of the opposite switch-point when one is elevated. These guards or guides may consist of the plates $b^2$, Fig. 3, disposed adjacent the web of the rails $b^3$, $b^4$, and $b^5$, designating flanged plates having vertical webs spaced from the rails and forming the inside guide-plates for the points, Figs. 1, 3, and 15. As shown, these guard-plates are of simple construction; but the outer guard $b^3$ is preferably of a construction to have a transverse face disposed adjacent the end of the switch-point to prevent its longitudinal displacement, it being understood, however, that any other suitable means may be provided for accomplishing this end.

The means for limiting the upward movement of the switch-points is most clearly illustrated in Figs. 4 and 13 and consists of a plurality of depending members having transverse extensions $b^6$ adapted to engage beneath the flange of the rail, it being seen in Fig. 4 that these hooks are disposed between ties. Also, as shown in Fig. 4, these extensions $b^6$ have beveled or sloping sides to prevent any obstructing matter being deposited thereon.

$b$, Fig. 4, represents a plurality of depending members carried by the switch-points and having hooked extensions disposed longitudinally of the point, forming a means for positively operating the points downwardly, as hereinafter described. These depending hooks may also be beveled off to form a knife-edge to prevent deposits thereon. While these hooks, as shown in Fig. 4, are disposed rearwardly, it will be understood that on the opposite switch-point the hooks are disposed in the opposite direction to be engaged by operating-lugs on the opposite end of the rock-shafts, all as hereinafter described.

As shown in Figs. 3 and 4, the cross-ties are cut away to receive portions of operating mechanism, which will now be described. Rock-shafts C are disposed in these cut-away portions. Each rock-shaft, as shown in detail in Fig. 6, is provided with the lugs $c$ $c'$, disposed at right angles to each other on the shaft, the shaft being also provided with a crank $C'$. These shafts are journaled in suitable saddles D, bolted to the ties, with the lugs $c$ $c'$ disposed beneath the respective switch-points B B'. There are a plurality of these rock-shafts, preferably one for each tie beneath the switch-point, three being illustrated in the drawings. The saddles are preferably provided with gripping-flanges $d$, adapted to engage the flange of the rail, it being seen in Fig. 3 that the upper portion of the saddle forms a support for the flange of the rail. These saddles are also provided with the inwardly-extending portions $d'$, the side walls of which are beveled, as shown in Fig. 4, to prevent deposits thereon, the upper face of these extensions $d'$ forming a further bearing for the rock-shaft.

Referring to Figs. 1 and 9, E represents a pair of contact-plates pivoted at $e$ between suitable angle-plates E', which in turn are disposed parallel with the track and are suitably bolted to the cross-ties. As shown in Fig. 9, these contact-plates E have oppositely-inclined top edges $e'$ $e^2$ and a downwardly-projecting lug $e^3$. These contact-plates are adapted to be forced downwardly against heavy springs $e^4$ in brackets $e^5$, suitably bolted to the angle-plates E', so that the plates E cannot ordinarily be pressed down by a person without the aid of powerful mechanical means. The free end of the contact-plates preferably is disposed between ties, and between these ties is mounted a crank-shaft F, Figs. 1, 5, and 9, which crank-shaft is journaled in suitable bearings F', suspended between the ties, and is provided with the cams $f$ $f'$, operative, respectively, beneath the lugs $e^3$ of the contact-plates E. This crank-shaft projects at its outer end beyond the main rail A and is provided with a crank-arm $F^2$, having diametrically-opposed crank-pins $f^2$ $f^3$. When the switch is intended to be solely operated automatically by the moving train, the lower crank-pin $f^3$ may be dispensed with, as shown in Fig. 9, but is preferably provided, as shown in the remaining figures, in order to form a connecting means for one of the cables to the office or distant station when the switch is designed to be operated therefrom, it also being understood that, if desired, the contact-plates E and their connections with the crank-arm $F^2$ may be dispensed with when it is not designed to operate the switch automatically by the train, as shown in Figs. 16 and 17, where the switch-throwing mechanism is controlled from a distant station, Fig. 17, and a local hand-operated switch, Fig. 16.

Referring to Figs. 1, 7, 11, and 12, G (see in detail Fig. 7) designates a crank-bar having the cam-faces $g$ $g'$ at opposite ends thereof. While in the drawings these cams $g$ $g'$ and also the cams $f$ $f'$ of the crank-shaft G are shown as being diametrically opposed on their respective shafts it will be obvious that they may be disposed at a lesser angle, provided the angle does not approximate closely a right angle. Thus the cam-faces always lie to one side of their axis in proper leverage relation to the operating-plates. This crank-bar G is journaled in suitable bearings G', suspended between the cross-ties, and extends from the track A' transversely beyond the main track A and is provided at its projecting end with a crank $G^2$, disposed in alinement with any one of the cranks C', carried by one of the rock-shafts C, the crank-pin of the crank C' of the particular rock-shaft being elongated for this purpose, and in the drawings we have illustrated the elongated crank-shaft as being a central one, as shown in Fig. 1. Disposed on the inside faces of the rails A' and A are a pair of flange-plates H H'. (See Figs. 1, 11, and 12.) These flange-plates H H', as shown most clearly in Fig. 11, are pivotally supported at one end, as at $h$, and are provided at their other end with a shoulder $h'$, adapted to operate beneath angle-bars $h^2$ for limiting their upward movement. These plates at their free end are supported, respectively, by the cam-surfaces $g$ and $g'$, the upper edge of the plates being adapted to be engaged by the flanges of the wheels on one side of the car, depending upon whether the train is running on the main track or siding. The cranks of the rock-shafts C are connected in series by the connecting-rod $C^2$, I designating a connecting-rod coupling the crank-shaft G, the series of rock-shafts C, and the crank-shaft F, being secured to this latter shaft by the pin $f^2$. As shown in Figs. 1, 8, and 17, this rod I is provided with the slotted portion I', adapted to receive an operating-arm.

In Figs. 2 and 16 is shown in detail a locking means for this rod I for holding the switch-points locked when they are in their full open or closed position. To this end the rod is provided with the enlarged portion $I^2$, having a slot $I^0$ adapted to receive the crank-pin on one of cranks C'. A chair or cradle J is provided, on which is pivotally supported a pair of upright latches $j$, having enlarged ends $j'$ adapted to engage the lugs $i$ $i'$ on the bar $I^2$ adjacent each end of the slot $I^0$. Interposed between these latches $j$ is a spring $j^2$, tending to pull them together, and their inward movement is limited by suitable lugs $j^3$. When in the position shown in Figs. 2 and 16, it will be obvious that the switch-points are locked and cannot be moved until the rod $I^2$ is reciprocated to the right to permit the lug $i'$ to become disengaged from the hook $j'$. When this has happened and the rod further shifted to the right until the end of the slot $I^0$ has been reached, a further reciprocation of the rod will commence to turn the cranks in their bearing and shift the switch-points until the lugs $i$ will become engaged by the opposite hook $j'$ and the parts again locked in their reversed positions. $k$ designates a rod connecting one of the crank-shafts to a semaphore or target K, one end of the rod being connected to a crank-arm on the semaphore and the other end to a crank on a rod $k'$, forming an extension of one of the tread rock-shafts C. (See Fig. 1.)

In Fig. 8 is illustrated a hand-operated mechanism for throwing the switches, which may be used by itself or in connection with the automatic and distant-station-operating mechanism, the same structure being also shown in Fig. 1. L represents a shaft journaled in brackets $l$, suspended between the ties, one end of the shaft being provided with an arm $l'$, operating in the slot I', and the other end of the shaft being provided with an operating-handle $l^2$, operating in a slotted plate $l^3$, which slotted plate is provided with a hinged plate $l^4$, provided with a cut-away portion $l^5$, disposed centrally of the slot $l^6$ in the plate $l^3$, so that when the plate $l^4$ is swung over to the closed position and the handle $l^2$ being in the position shown in Fig. 8, with the arm $l'$ out of engagement with the arm I', the cut-away portion $l^5$ will fit around the handle $l^2$ and lock the same against movement, suitable locking means being provided for the plate, illustrated in the drawings by an aperture $l^7$, adapted to fit over a staple $l^8$, through which a padlock may be passed. The parts are shown in their unlocked position in Fig. 8 and in their locked position in Fig. 1.

In addition to the locking means shown in Fig. 2 for holding the various shafts in a locked position dependent upon the reciprocation of the rod I, it is desirable to also provide means tending to hold the rod I against reciprocation. A similar means for accomplishing this end is shown in Fig. 14, wherein a strong spring M, suitably secured at one end and tensioned at its other end to spring downwardly, engages a pin $f^4$ on the inside of the crank-arm $F^2$ above its pivotal axis, so that when the pin $f^4$ rests on either side of a vertical plane disposed in the axis F the tendency of the spring will be to force the crank $F^2$ to its extreme position and normally hold the rod I against reciprocation.

In Fig. 15 is illustrated means for operating the switch-points from a distant station and by a hand-lever. From the foregoing description this will be clearly understood, $I^x$ designating a rod corresponding to the rod I, and 1 and 2 designating cables connected to the upper and lower crank-pins 3 and 4 of a double crank, and 5 designating a protective casing for these cables. In this construction also the hand-operating means is simply a lever 6, corresponding to the arm $l'$. (Shown in Figs. 1 and 8.)

In Fig. 17 is also illustrated a means for operating the switch-points from a distant station, in addition to means for indicating the position of the switch-points and also for sounding an alarm. In this construction the cables corresponding to the cables 1 and 2 are connected to crank-pins corresponding to the crank-pins 3 and 4 or the crank-pins $f^2$ and $f^3$, as the case may be, the other ends of the cables being connected to a central pivoted arm 7, carrying a pointer 8. The end of this pointer operates adjacent a segmental plate 9 and indicates the position of the switch thereon, a second segmental plate 10 being arranged in the path of travel of the pointer 8, which latter has a contact-point engaging the plate 10, the plate 10 and the pointer forming a means for closing an electric circuit having a bell therein, from which it will be obvious that the bell will ring during the operation of throwing the switch and unless the switch-points are completely thrown will continue to ring and give warning. 11 shows diagrammatically a lever for operating the cables, and consequently the switch-points.

In Fig. 10 is shown a contact device, preferably mounted on the engine. 12 is a collar revolubly on the axle, and diametrically opposed on this collar are the lugs 13 $13^a$ and the arm 14, it being understood that the lugs 13 $13^a$ are arranged out of alinement, the arm 14 being connected with a lever in the cab. 15 $15^a$ are a pair of arms pivotally connected at their forward end to the frame of the engine and at their free ends comprising casings 16 $16^a$, having the rollers 17 $17^a$ journaled therein. Springs 18, interposed between these arms and the frame of the engine, normally tend to elevate them. It will be also understood that the wheels 17 $17^a$ are adapted to be brought in contact with the pivoted contact-plates E. By this construction it will be seen that the contact-rollers are operatively engaged by positive means supported at a fixed height with reference to the car-wheels, as contradistinguished from other forms of tripping devices which are carried by the car proper or trucks, and hence do not maintain a uniform height relatively to the car-wheels, owing to the interposition of the usual spring connections between the axles and trucks.

The general operation will be obvious from the foregoing description; but it may be briefly referred to as follows: In the position shown in Fig. 1, the switch being set for the main track, the parts are securely held in position by the locking means heretofore described, the switch-point B being elevated and the switch-point B' depressed, the wheels on the left side of the car being guided by the beveled portion $b'$ on the main rail $A^2$, and the flanges of the wheels on the right-hand side of the car will pass over the cut-away portion $a^3$, this construction, as heretofore stated, allowing the end of the rail $A^3$ to be brought closer to the main rail A, obviating the necessity of a long switch-point.

It will be understood that the flange-plates on the opposite sides of the track operate in synchronism with the switch-points, so that, the switch-point B' being in its depressed position in the present illustration, the flanges on the right-hand side of the cars will pass over the flange-plate H'.

We will assume now that the switch has been set for the siding, with the switch-point B' elevated and the switch-point B depressed, and that a train on the main track is to be sent past the switch in a direction opposite to that just described. In such a case with the parts set for the siding it is obvious that the car-wheel flanges would bind between the main rail A and the switch-point B'. However, the flange-plate H' being elevated, the flanges of the car-wheels will strike this plate, which in turn will engage the cam-face g', rocking the crank G, which, through the connecting-rod I, will operate the rock-shafts C, the lugs c' on the rock-shaft engaging the hooks $b^7$, Fig. 4, which will positively operate the switch-point B' downwardly, the switch-point B being simultaneously forced upwardly by the lugs c. It might also be observed that in order to further protect the switch-points when in their elevated position the parts might be so arranged that the tread of the switch-point will be a little lower than its adjacent unbroken rail, so that the weight of the train will be supported by the unbroken rail until the wheels have advanced a considerable distance beyond the pointed end of the switch-point, or the pointed ends of the switch-points might be slightly beveled on their tread-surface, so that the points only would be below the tread-surface of the unbroken rails, with the tread-surfaces of the rear portion of the switch-points lying flush therewith, this to prevent any jarring when the wheels leave the unbroken rail.

While the foregoing illustrates an application of our improvements, it will be understood that we do not limit ourselves to the exact details as shown and described, it being obvious that various changes might be made without departing from the spirit of the invention.

What we claim is—

1. In a railway-switch, the combination with movable switch-points, and means for operating the same, of a broken main rail and a broken siding-rail terminating adjacent the rear ends of said switch-points and having the tread portions of their ends cut away to form a recess for the reception of the flange of a car-wheel.

2. In a railway-switch, the combination with movable switch-points, and means for operating the same, of a broken main rail and a broken siding-rail terminating adjacent the rear ends of said switch-points and having the tread portions of their ends cut away forming a recessed horizontal face and a vertical wedge-shaped tread.

3. In a railway-switch, the combination with the main track and siding rails, of a pair of adjacent switch-points, and means for bodily elevating one of said switch-points and simultaneously lowering the other, the base of said switch-points being of the same thickness throughout their lengths, and the forward tread-surface of said switch-points being cut away to form a recessed horizontal face and a vertical wedge-shaped tread.

4. In a railway-switch, the combination with the main track and siding rails, of a pair of switch-points adjacent thereto, means for bodily elevating one of said switch-points and simultaneously lowering the other, and means for limiting the upward movement of said switch-points, comprising stops carried by same.

5. In a railway-switch, the combination with the main track and siding rails, of a pair of switch-points adjacent thereto, means for bodily elevating one of said switch-points and simultaneously lowering the other, and means for limiting the upward movement of said switch-points, comprising transversely-disposed hooks depending from the switch-points and adapted to engage beneath the rails.

6. In a railway-switch, the combination with unbroken main rails one of said main rails branching off into a siding rail, a broken main-rail section and siding rail terminating immediately alongside of said first-mentioned rails and having their tread-surfaces cut away to form a wedge-shaped tread with a recess adjacent said first-mentioned rails to receive the flange of the wheels, of a pair of switch-points disconnected from and having their rear ends terminating adjacent said recessed ends of said broken main and siding rails, said switch-points cut away at their forward ends to form a recess and a wedge-shaped tread, and means for bodily elevating one of said switch-points and simultaneously lowering the other.

7. In a railway-switch, the combination with a pair of switch-points disconnected from the rails, and means for bodily elevating one of said switch-points and simultaneously lowering the other, of flange-plates located adjacent the inside face of one of the main track-rails and siding-rails, said flange-plates being so connected as to operate simultaneously in reverse vertical directions, and means connecting said flange-plates with said switch-points to throw said switch-points, substantially as described.

8. In a railway-switch, the combination with the main and siding rails and suitable switch-points, with means for operating the same, of flange-plates pivoted at one end to the inside face of one of said main rails and siding-rails, and having their upper edges disposed in the plane of travel of the car-wheel flange, means connecting said flange-plates to simultaneously operate said plates reversely in vertical planes, means connecting said plates to said switch-points to throw the latter, and means for limiting the upward movement of said flange-plates.

9. In a railway-switch, the combination with the main and siding rails and suitable switch-points, with means for operating the same, of flange-plates pivoted at one end to the inside face of one of said main rails and siding-rails, and having their upper edges disposed in the plane of travel of the car-wheel flange, means connecting said flange-plates to simultaneously operate said plates reversely in vertical planes, means connecting said plates to said switch-points to throw the latter, and means for limiting the upward movement of said flange-plates, comprising angle-rods disposed in the path of travel of said plates and adapted to engage same at a predetermined point of their upward movement.

10. In a railway-switch, the combination with suitable switch-points and means for throwing same, comprising an operating crank-shaft having a crank thereon, contact-plates adapted to be engaged by a moving car and operate said crank-shaft, a reciprocating rod operatively connecting said crank and switch-points, and means for holding said crank and reciprocating-rod in their extreme positions comprising a lug carried by said crank and a spring member having its free end engaging above said lug.

11. In an automatic railway-switch having switch-points, contact-plates and operative connections therebetween, the combination of contacting means carried by the rolling-stock, comprising a pair of pivoted arms having contact-rollers journaled thereon, lugs pivotally supported at a fixed height relatively to the car-wheels, and means for bringing said lugs into operative engagement with said rollers.

12. In an automatic railway-switch having switch-points, contact-plates and operative connections therebetween, the combination of contacting means carried by the rolling-stock, comprising a pair of pivoted arms having contact-rollers journaled thereon, a collar or wrist adapted to be revolubly mounted on the axle of the car, angularly-disposed lugs carried by said collar, and means for oscillating said collar or wrist, substantially as described.

13. In a railway-switch, the combination with the cross-ties having their upper face longitudinally recessed, saddles in said recessed portion and having top faces flush with top faces of the ties to solidly support the unbroken rails of the track, switch-points, and operating-shafts for said switch-points extending longitudinally within said recessed portions.

In testimony whereof we affix our signatures in presence of two witnesses.

WILLIAM W. HOFFMAN.
FRANCIS W. POWERS.

Witnesses:
JOSEPH S. HANSON,
DAVID BRYAN.